United States Patent
Masuda

(10) Patent No.: US 9,118,070 B2
(45) Date of Patent: Aug. 25, 2015

(54) ENERGY STORAGE ELEMENT

(71) Applicant: GS Yuasa International Ltd., Kyoto-shi, Kyoto (JP)

(72) Inventor: Hideki Masuda, Kyoto (JP)

(73) Assignee: GS Yuasa International Ltd., Kyoto-shi, Kyoto (JP)

( * ) Notice: Subject to any disclaimer, the term of this patent is extended or adjusted under 35 U.S.C. 154(b) by 142 days.

(21) Appl. No.: 13/688,097

(22) Filed: Nov. 28, 2012

(65) Prior Publication Data

US 2013/0196218 A1 Aug. 1, 2013

(30) Foreign Application Priority Data

Nov. 29, 2011 (JP) ................................. 2011-261070
Nov. 9, 2012 (JP) ................................. 2012-247811

(51) Int. Cl.
*H01M 2/26* (2006.01)
*H01M 2/30* (2006.01)
*H01M 2/22* (2006.01)

(52) U.S. Cl.
CPC ...... *H01M 2/30* (2013.01); *H01M 2/22* (2013.01); *H01M 2/26* (2013.01); *H01M 2/263* (2013.01); *H01M 2220/30* (2013.01)

(58) Field of Classification Search
CPC ............ H01M 2/0217; H01M 2/0469; H01M 2/0473; H01M 2/06; H01M 2/263
See application file for complete search history.

(56) References Cited

U.S. PATENT DOCUMENTS

| | | | |
|---|---|---|---|
| 2006/0216592 A1 | 9/2006 | Chun | |
| 2010/0233528 A1* | 9/2010 | Kim et al. | 429/178 |
| 2010/0233529 A1* | 9/2010 | Nansaka et al. | 429/181 |
| 2012/0021277 A1* | 1/2012 | Byun et al. | 429/178 |
| 2012/0088138 A1* | 4/2012 | Munenaga et al. | 429/94 |
| 2012/0148909 A1 | 6/2012 | Ito et al. | |
| 2012/0148911 A1* | 6/2012 | Suzuki et al. | 429/179 |
| 2012/0189884 A1* | 7/2012 | Guen | 429/82 |
| 2012/0237817 A1* | 9/2012 | Kim | 429/158 |
| 2012/0264007 A1* | 10/2012 | Sasaki et al. | 429/182 |
| 2012/0276442 A1* | 11/2012 | Kim et al. | 429/179 |
| 2013/0004833 A1* | 1/2013 | Kim | 429/181 |
| 2013/0171511 A1* | 7/2013 | Masuda | 429/181 |
| 2013/0273418 A1* | 10/2013 | Saito, Akinori | 429/179 |

FOREIGN PATENT DOCUMENTS

JP 2006-269423 A1 10/2006
WO WO 2010147136 A1 * 12/2010

* cited by examiner

*Primary Examiner* — Ula C Ruddock
*Assistant Examiner* — Scott J Chmielecki
(74) *Attorney, Agent, or Firm* — McGinn IP Law Group, PLLC

(57) ABSTRACT

An energy storage element comprising: a container; an electrode assembly housed in the container; an electrode terminal provided in the container; and a current collector which electrically connects the electrode terminal and the electrode assembly, wherein the current collector is positioned inside the container, and includes: a base part connected to the electrode terminal; and arm parts which have a plate shape, extend from the base part, and are connected to the electrode assembly in a state that the plate-shaped arm parts sandwich the electrode assembly, and paired arm parts which are outermost two of the arm parts are apart from each other with a spacing larger than a width of the base part in a direction in which the paired arm parts are arranged.

15 Claims, 10 Drawing Sheets

ENERGY STORAGE ELEMENT

CROSS REFERENCE TO RELATED APPLICATIONS

The present application is based on and claims priority of Japanese Patent Application No. 2011-261070 filed on Nov. 29, 2011 and Japanese Patent Application No. 2012-247811 filed on Nov. 9, 2012. The entire disclosures of the above-identified applications, including the specifications, drawings and claims are incorporated herein by reference in their entirety.

FIELD

The present invention relates to an energy storage element such as a secondary battery and another battery.

BACKGROUND

Secondary batteries are used as replacements for primary batteries, and have been wide spread as power sources for electric appliances such as mobile phones and information technology (IT) devices. In particular, non-aqueous electrolyte secondary batteries represented by lithium ion batteries have high energy density and are increasingly applied to large industrial electric apparatuses such as electric vehicles.

Such a conventional non-aqueous electrolyte secondary battery is configured to supply energy generated in the electrode assembly to the electrode terminals by means of the current collectors connecting the electrode assembly housed inside the container body and the electrode terminals disposed outside the container (for example, see Patent Literature 1).

CITATION LIST

Patent Literature

PTL 1
  Japanese Unexamined Patent Application Publication No. 2006-269423

SUMMARY

The present invention has been made in view of the aforementioned problem, with an aim to provide an energy storage element which is capable of increasing the housing efficiency of the electrode assembly with respect to the capacity of the container.

In order to achieve the aforementioned aim, an energy storage element according to an aspect of the present invention is an energy storage element including: a container; an electrode assembly housed in the container; an electrode terminal provided in the container; and a current collector which electrically connects the electrode terminal and the electrode assembly, wherein the current collector is positioned inside the container, and includes: a base part connected to the electrode terminal; and plate-shaped arm parts which extend from the base part and which are connected to the electrode assembly in a state that the plate-shaped arm parts sandwich the electrode assembly, and paired arm parts which are outermost two of the arm parts are apart from each other with a spacing larger than a width of the base part in a direction in which the paired arm parts are arranged.

In this way, the paired arm parts which are outermost two of the arm parts of the current collector are configured to sandwitch the electrode assembly, and are apart from each other with a spacing larger than the width of the base part in the direction in which the paired arm parts are arranged.

For this reason, for example, it is possible to secure a wide spacing between the paired arm parts which sandwitch the electrode assembly, and thereby it is possible to secure a wide space for housing the electrode assembly to be sandwitched by the paired arm parts. In other words, it is possible to increase the volume of the electrode assembly to be housed inside the container, and thereby further increase the housing efficiency of the electrode assembly with respect to the capacity of the container.

In addition, the paired arm parts may include: paired arm bodies connected to the electrode assembly; and paired bridge parts which connect the paired arm bodies and the base part, and the paired bridge parts are apart from each other with spacings that are smaller at positions closer to the base part.

In this way, the paired bridge parts which connect (i) the paired arm bodies connected to the electrode assembly and (ii) the base part of the current corrector are apart from each other with spacings that are smaller at the positions closer to the base part. In other words, the paired arm parts are spaced apart more than the width of the base part in the direction in which the paired arm parts are arranged, by forming the paired bridge parts to be apart from each other with spacings that are smaller at the positions closer to the base part.

For this reason, for example, it is possible to secure a wide spacing between the paired arm bodies connected to the electrode assembly, and thereby it is possible to secure a wide space for housing the electrode assembly to be sandwitched by the paired arm parts. For this reason, it is possible to further increase the housing efficiency of the electrode assembly with respect to the capacity of the container.

In addition, the paired bridge parts may be flat plate-shaped parts which connect the paired arm bodies and the base part.

For example, when the electrode assembly is an electrode assembly of a winding type, it is possible to form the bridge parts of the arm parts of the current collector along the side surface of the electrode assembly, and it is possible to form the arm parts of the current collector to have a shape that matches the shape of the electrode assembly. For this reason, it is possible to further increase the housing efficiency of the electrode assembly with respect to the capacity of the container.

In addition, the base part may include: a plate part which is directly connected to the electrode terminal; and wall parts which are formed continuously from the paired bridge parts and are curved or bent with respect to the plate part.

In this way, the base part of the current collector includes the plate part and the wall parts which are bent or curved with respect to the plate part, and the wall parts are formed continuously from the paired bridge parts of the paired arm parts. For this reason, it is possible to increase the strength of the base part of the current collector, and prevent deformation of the arm parts.

In addition, the container may include a wall having an outer surface and an inner surface, the outer surface having a protrusion part formed to protrude outward from the outer surface and the inner surface having a recess part formed at a position corresponding to a position of the protrusion part, and the base part of the current collector may be connected to the electrode terminal in the recess part.

According to this, the container includes the wall having the outer surface with the protrusion part and the inner surface with the recess part. The recess part is formed at the position corresponding to the position of the protrusion part. The current collector electrically connected to the electrode terminal inside the container includes the base part connected to the electrode terminal inside the recess. part.

In this way, the base part which is an element of the current collector connected to the electrode terminal is housed in the recess part formed on the wall of the container. Thus, it is possible to match the space other than the space occupied by the recess part in the inner space of the container to the shape of the electrode assembly. In this way, it is possible to reduce wasteful space produced when the electrode assembly is housed inside the container only by adjusting the outer size of the electrode assembly to the size of the inner space. In this way, the shape of the container is adjusted to the shape of the electrode assembly without changing the structure of the electrode assembly. Therefore, it is possible to easily increase the housing efficiency of the electrode assembly with respect to the inner space (capacity) of the container.

In addition, the recess part may have a bottom surface, and a side surface continuously formed between (i) the bottom surface and (ii) the inner surface of the wall, and the side surface may have a shape corresponding to at least one of outer shapes of the paired bridge parts and outer shapes of the wall parts.

In this way, even in a state where the base part is disposed along the inner surface of the recess part, the wall parts and the bridge parts of the arm parts are arranged along the inner surface of the recess part. Thus, it is possible to reduce mechanical stress added to the recess part or the current collector when the current collector is fixed in the recess part.

In addition, the energy storage element further may include an insulation member disposed between the recess part and the base part of the current collector, wherein the insulation member and the base part may be housed in a space which is defined by (i) a bottom surface of the recess part and (ii) the inner surface of the wall.

In this way, (i) the insulation member for insulating the container and the current collector and (ii) the base part of the current collector are housed inside the recess part of the container. For this reason, it is possible to approximate the inner shape of the container and the outer shape of the electrode assembly. In other words, it is possible to make the electrode assembly closer to the surface of the container as much as possible when the electrode assembly is housed in the container. For this reason, it is possible to increase the housing efficiency of the electrode assembly with respect to the capacity of the container even when the energy storage element is configured to include the insulation member inside the container.

In addition, the recess part may include a through-hole through which the electrode terminal penetrates, the electrode terminal may include: a plate-shaped terminal body disposed at a position corresponding to the recess part and outside the container; a column-shaped connection part which penetrates through the through-hole of the recess part; and a pressure-bonding end part which is electrically connected to the current collector by sandwitching and pressure-bonding, in the recess part, the container and the current collector together with the terminal body, wherein the base part, the pressure-bonding end part and the insulation member may be housed in the space defined by (i) the bottom surface of the recess part and (ii) the inner surface of the wall.

In addition, the pressure-bonding end part may be a riveted end formed by riveting an end part of the connection part so that the riveted end has an outer diameter larger than a diameter of the through-hole, the end part of the connection part being positioned opposite to the terminal body in the electrode terminal.

In this way, the pressure-bonding part for connecting the electrode terminal to the current collector is housed in the recess part of the container, in addition to the insulation member and the base part of the current collector. For this reason, it is possible to approximate the inner shape of the container and the outer shape of the electrode assembly. In other words, it is possible to make the electrode assembly closer to the surface of the container as much as possible when the electrode assembly is housed in the container. For this reason, it is possible to increase the housing efficiency of the electrode assembly with respect to the capacity of the container even when the energy storage element is configured to include the insulation member inside the container.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENTS

The non-aqueous electrolyte secondary battery according to a conventional technique has the aforementioned structure. The conventional technique has problems as described below.

Figure 9:
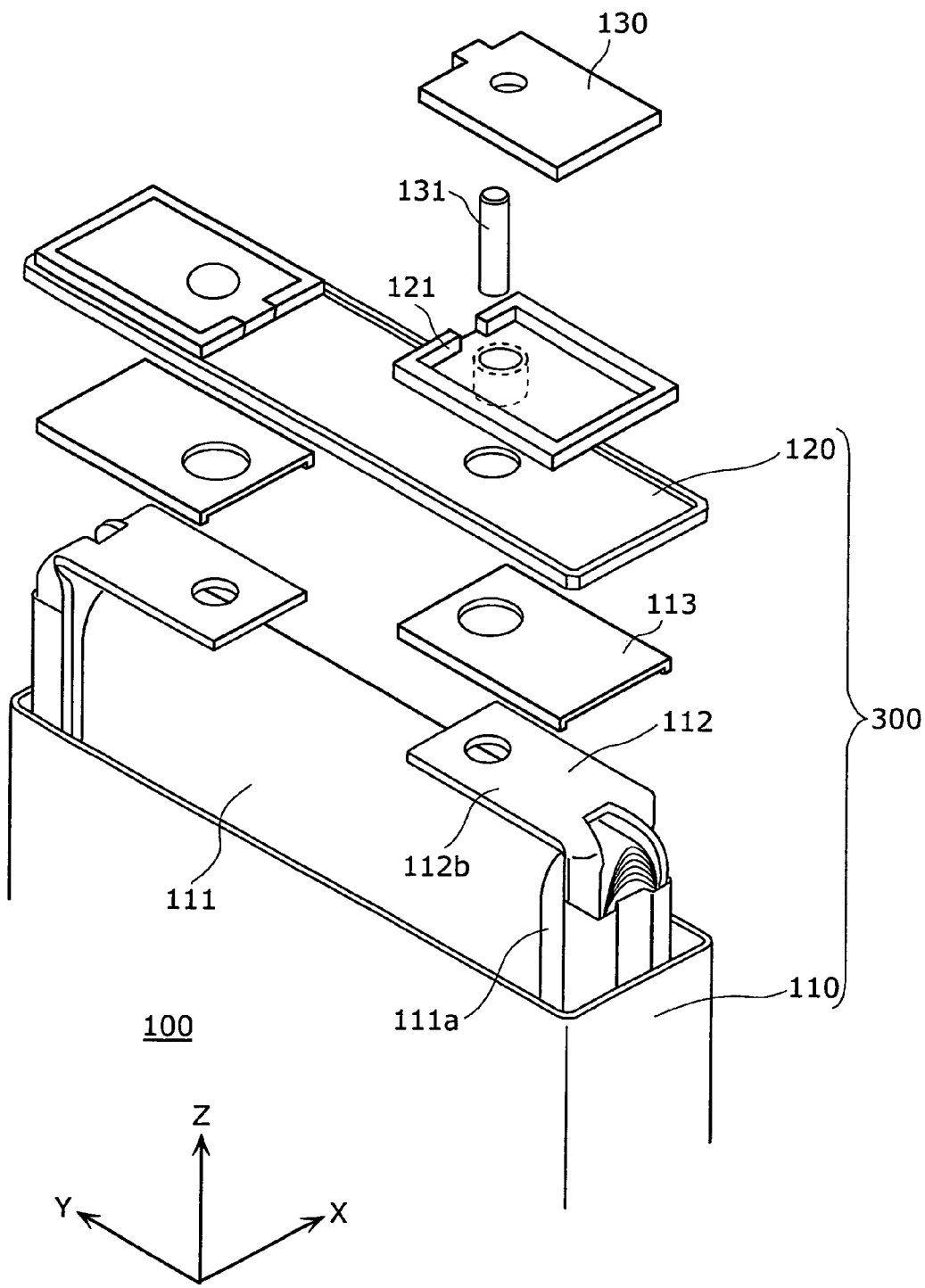
FIG. 9 is a schematic exploded perspective view of a non-aqueous electrolyte secondary battery according to a conventional technique.

More specifically, as shown in FIG. 9, the non-aqueous electrolyte secondary battery 100 according to the conventional Patent Literature includes: an electrode terminal 130, a container 300 including a cap part 120 and a container body 110, a current collector 112, an electrode assembly 111, an external insulation sealing member 121 for insulating the electrode terminal 130 and the container 300, and an internal insulation sealing member 113 for insulating the current collector 112 and the container 300. Among the structural elements of the non-aqueous electrolyte secondary battery 100, the internal insulation sealing member 113, the current collector 112, and the electrode assembly 111 are mainly housed inside the container 300. The current collector 112 includes a base part 112b connected to the electrode assembly 130 and arm parts 112c which sandwich, for connection, the electrode assembly 111 at the both ends in the X-axis direction of the base part 112b.

If it is possible to increase the volume rate (hereinafter referred to as "housing efficiency") of the electrode assembly 111 in the inner space of the container 300 of a non-aqueous secondary battery, it is possible to easily increase the battery capacity without increasing the volume of the non-aqueous secondary battery. For this reason, it is necessary to efficiently house the electrode assembly 111 in the inner space of the container 300.

Figure 10:
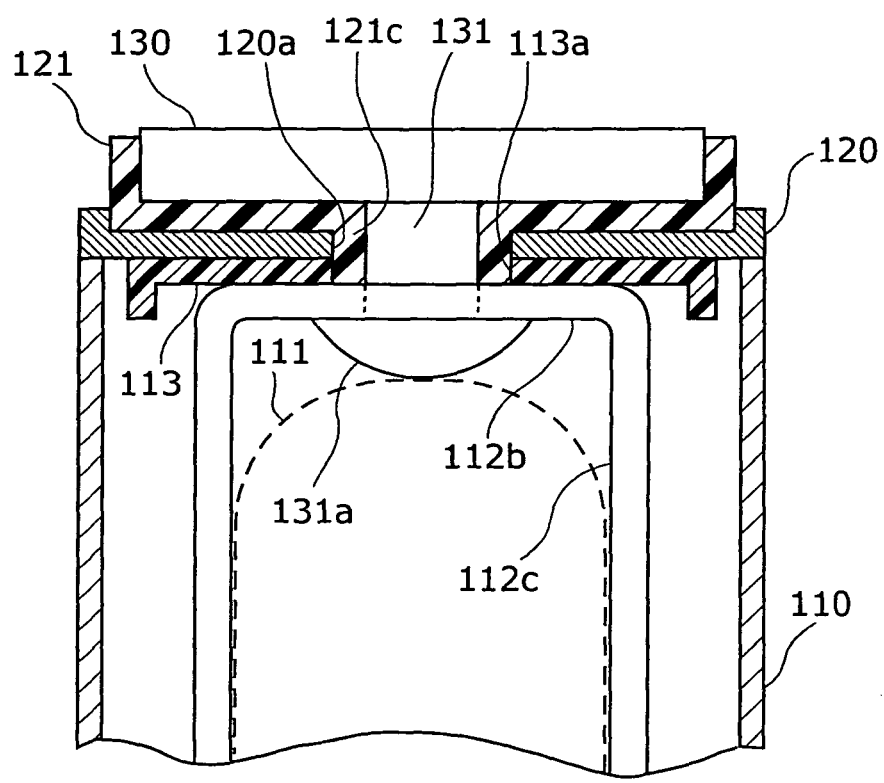
FIG. 10 is a cross-sectional view of the non-aqueous electrolyte secondary battery according to the conventional technique.
Figure 10:
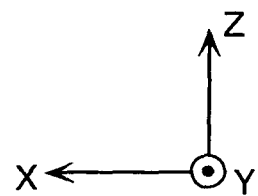

As shown in FIG. 10, in a non-aqueous electrolyte secondary battery 100 in Patent Literature 1, arm parts 112c extend in a straight line from the both ends of the base part 112b to a side surface of the electrode assembly 111. However, the arm parts 112c are configured to sandwitch the both ends in the X-axis direction of the electrode assembly 111, and thus, for example, the width in the X-axis direction of the electrode assembly 111 to be sandwitched needs to be reduced when the width in the X-axis direction of the base part 112b of the current collector 112 must be reduced. For this reason, the housing efficiency of the electrode assembly 111 with respect to the capacity of the container 300 inevitably decreases. Exemplary cases conceivable as a case where the width in the X-axis direction of the base part 112b of the current collector 112 needs to be reduced include: a case where the contact area between the base part 112b and the container 300 is reduced; and a case where the current collection path for the current collector 112 is reduced. The purpose in these cases is to reliably insulate the base part 112b of the current collector 112 and the container 300.

Hereinafter, an embodiment of the present invention is described with reference to the drawings. The exemplary embodiment described below shows a specific preferable example. The numerical values, shapes, materials, structural elements, the arrangement and connection of the structural elements etc. shown in the following exemplary embodiment are mere examples, and therefore do not limit the scope of the present invention. Therefore, among the structural elements in the following exemplary embodiment, structural elements not recited in any one of the independent claims defining the most generic concept of the present invention are described as arbitrary structural elements in preferable implementations.

Embodiment

Figure 1:
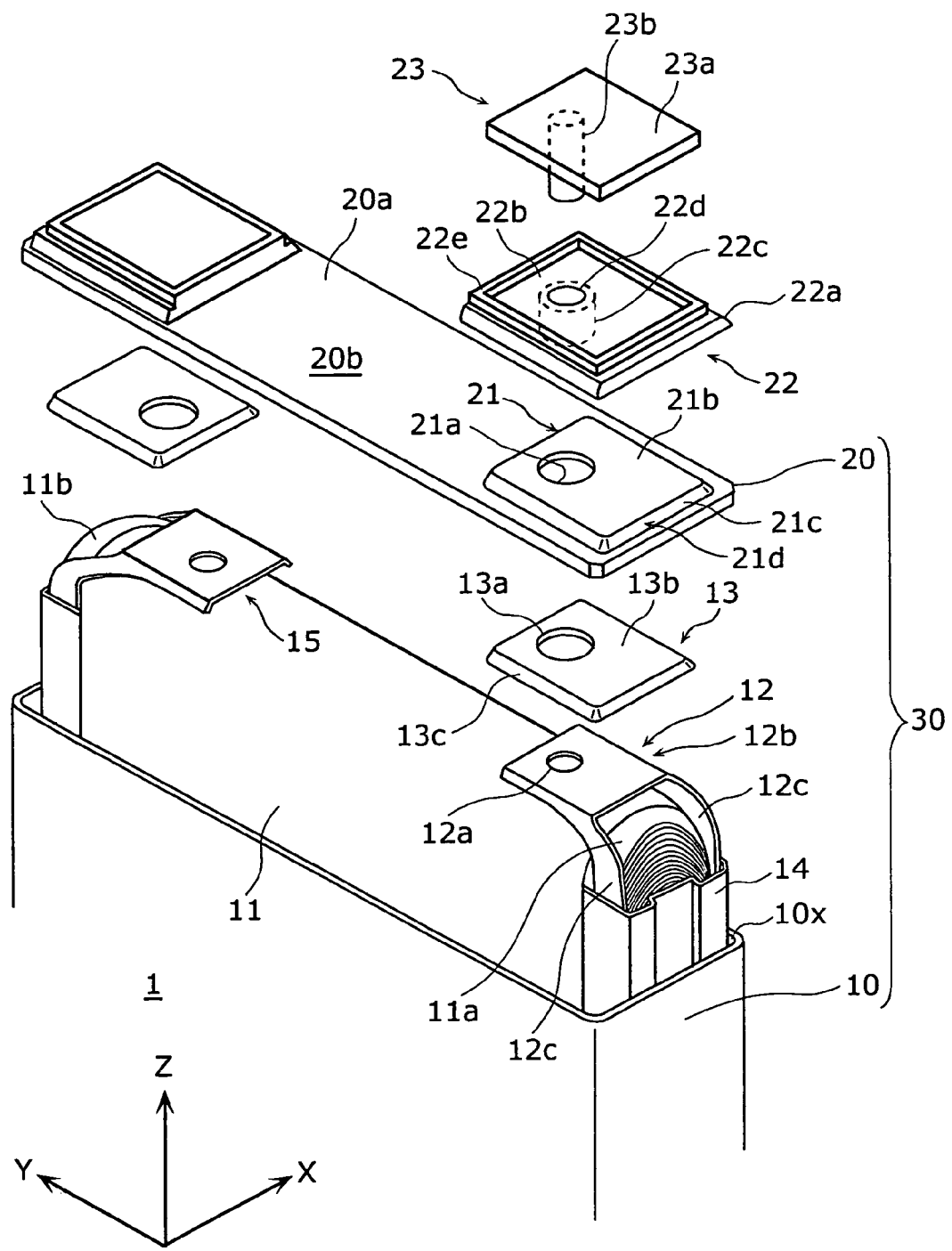
FIG. 1 is a schematic exploded perspective view of a non-aqueous electrolyte secondary battery according to an embodiment of the present invention.

FIG. 1 is a schematic exploded perspective view of a non-aqueous electrolyte secondary battery 1 having an exemplary structure according to an embodiment of the present invention.

As shown in FIG. 1, the non-aqueous electrolyte secondary battery 1 includes: a container 30; an electrode assembly 11 housed inside the container 30; an electrode terminal 23 housed in the container 30; current collectors 12 and 15 for electrically connecting the electrode terminal 23 and the electrode assembly 11; an external insulation sealing member 22 which insulates the container 30 and the electrode terminal 23; and an internal insulation sealing member 13 for insulating the container 30 and the current collectors 12 and 15.

The container 30 includes a cap part 20 and a container body 10. The cap part 20 is a member having a long plate shape extending in the Y-axis direction (described later). The container body 10 is a rectangular cylindrical member having an opening 10x at a first end and a bottom at a second end. In this embodiment, the direction in which the container body 10 and the cap part 20 are arranged is referred to as an upper-lower direction (the Z-axis direction in FIG. 1), the direction in which a positive terminal and a negative terminal are arranged is referred to as a left-right direction (the Y-axis direction in FIG. 1), and the direction perpendicular to the upper-lower direction and the left-right direction is referred to as a front-back direction (the X-axis direction in FIG. 1).

The cap part 20 includes, at each of the end parts in the lengthwise direction, a protrusion part 21 which protrudes outward from an upper surface 20b of the cap part 20 of the container 30 and a plate-shaped cap body 20a which is the part other than the protrusion part 21. Here, the upper surface 20b of the cap part 20 is an outer surface of the cap body 20a of the container 30. In other words, the cap part 20 of the container 30 includes a wall having an outer surface partly protrudes outward to be the protrusion part 21.

The protrusion part 21 includes a plate part 21b which is a top part and a side wall part 21d. The plate part 21b is a flat-plate shaped member which makes up the upper part of the protrusion part 21, has a shape of a rectangle having parallel sides in the X-axis direction and the Y-axis direction in a plan view, and is parallel to the cap body 20a. In addition, the protrusion part 21 includes the plate part 21b with a through-hole 21a for allowing penetration of the electrode terminal 23. Here, FIG. 1 shows only a through-hole 21a at the positive electrode side, and does not show a through-hole at the negative electrode side because the latter through-hole is hidden behind an insulation sealing member later described.

An electrode assembly 11 is formed by stacking band-shaped positive and negative electrodes with a separator in between and winding the whole stack in the shape of a long cylinder. The electrode assembly 11 is housed in the container 30 in the direction in which the winding axis direction matches the Y-axis direction and the long axis of the cross section of the long circle matches the Z-axis direction. The positive electrode and the negative electrode are shifted from each other in the winding axis direction and are wound about the winding axis direction in the shape of a long circle. The electrode assembly 11 includes projection parts 11a and 11b corresponding to the positive electrode and the negative electrode and each of which projects outward from a corresponding separator in the winding axis direction (the Y-axis direction) of the electrode assembly 11. In other words, the electrode assembly 11 includes the projection part 11a disposed at the positive electrode side and projecting from the separator at a first end in the winding axis direction, and the projection part 11b disposed at the negative electrode side and projecting from the separator at a second end in the winding axis direction. Furthermore, the projection part 11a at the positive electrode side and the projection part 11b at the negative electrode side do not include any active material, and thus metal foil which is a base material thereof is exposed. More specifically, the projection part 11a at the positive electrode side includes exposed aluminum foil which is the base material of the positive electrode without any positive electrode active layer, and the projection part 11b at the negative electrode side includes exposed cupper foil which is the base material of the negative electrode without any negative electrode active layer. To the projection part 11a at the positive electrode side and the projection part 11b at the negative electrode side, a current collector 12 at the positive electrode side and a current collector 15 at the negative electrode side are electrically connected, respectively.

The current collector 12 has an upper end part with a plate-shaped part (a plate part 12b1 later described) which is parallel to the upper surface of the electrode assembly 11 (which is parallel to the X-Y plane). The plate-shaped part has a through-hole 12a. The current collector 12 disposed at the positive electrode side which is a first end of the winding axis direction in which the electrode assembly 11 is wound has curved sides (arm parts 12c described later) which are along an outer side surface in the X-axis direction of the projection part 11a and which extend in the Z-axis direction. These curved sides are sandwitched by holding plates 14 made of aluminum or an aluminum alloy together with the projection part 11a at the positive electrode side, and are connected and fixed by ultrasonic welding or the like. The current collector 15 at the negative electrode side also has the same or similar structure, and is formed with cupper or a cupper alloy. The current collector 12 at the positive electrode side and the current collector 15 at the negative electrode side are the same or similar in structure. Thus, only the current collector 12 at the positive electrode side is described, and the current collector 15 at the negative electrode side is not described.

The structure of the current collector 12 (and the current collector 15) is described in detail later.

The internal insulation sealing member 13 is an insulation member which insulates the container 30 and the current collector 12 by being sandwitched between the cap part 20 and the base part 12b (see a later-provided description) of the current collector 12. In other words, the internal insulation sealing member 13 is an insulation member which is disposed inside the container 30 and is for insulating the container 30 from the electrode assembly 11 electrically connected via the current collector 12. In addition, the internal insulation sealing member 13 functions as a sealing member (packing) for sealing the through-hole 21a by being pressure-bonded to the through-hole 21a formed in the cap part 20 of the container 30 together with the electrode terminal 23 and the external insulation sealing member 22. The internal insulation sealing member 13 has a shape for covering the base part 12b of the current collector 12 from the side of the electrode terminal 23. The internal insulation sealing member 13 is made of a synthetic resin or the like, and has insulation and elastic properties. In addition to the through-hole 21a of the cap part 20 and the through-hole 12a of the current collector 12, the internal insulation sealing member 13 includes a through-hole 13a for allowing penetration of a connection part 23b (later described) of the electrode terminal 23.

The external insulation sealing member 22 is an insulation member which insulates the electrode terminal 23 and the container 30 by being sandwitched between the terminal body 23a (later described) of the electrode terminal 23 and the protrusion part 21 of the cap part 20. In other words, the external insulation sealing member 22 is an insulation member which is disposed outside the container 30 and is for insulating the container 30 from the electrode assembly 11 electrically connected via the electrode terminal 23 and the current collector 12. In addition, the external insulation sealing member 22 functions as a sealing member (packing) for sealing the through-hole 21a by being pressure-bonded to the through-hole 21a formed in the cap part 20 of the container 30 together with the electrode terminal 23 and the internal insulation sealing member 13. The external insulation sealing member 22 is disposed on the plate part 21b of the protrusion part 21, and includes a cylinder-shaped cylinder part 22c which is formed to be in contact with a through-hole 22d in the plate part 22b and to extend below the plate part 22b. In other words, the external insulation sealing member 22 includes the cylinder part 22c and the plate part 22b extending in the direction which is a direction crossing the axis of the cylinder part 22c and outward of the cylinder part 22c.

In addition, the external insulation sealing member 22 includes a side wall part 22a formed at the outer edge of the plate part 22b along side surfaces of the protrusion part 21. In other words, the external insulation sealing member 22 is a member including the plate part 22b and the side wall part 22a for covering the outside of the protrusion part 21.

The external insulation sealing member 22 is a member made of a synthetic resin, as in the case of the internal insulation sealing member 13. The through-hole 22d formed in the external insulation sealing member 22 allows penetration of the later-described electrode terminal 23 by means of the connection part 23b, in addition to the through-hole 21a formed in the cap part 20, the through-hole 13a formed in the internal insulation sealing member 13, and the through-hole 12a formed in the current collector 12.

In addition, the cylinder part 22c of the external insulation sealing member 22 is formed at the side (the lower side of the plate part 22b) facing the cap part 20, and has an inner edge which matches the through-hole 22d. In addition, the cylinder part 22c has an outer edge which fits into the through-holes 13a and 21a. Accordingly, the cylinder part 22c is sandwitched between the through-hole 21a formed in the protrusion part 21 of the container 30 and the connection part 23b of the electrode terminal 23. In other words, the external insulation sealing member 22 insulates the electrode terminal 23 and the container 30 by being sandwitched between the terminal body 23a of the electrode terminal 23 and the plate part 21b of the protrusion part 21 of the container 30 and being sandwitched between the connection part 23b of the electrode terminal 23 and the protrusion part area having the through-hole 21a in the cap part 20 of the container 30.

Furthermore, a frame body 22e is formed on the marginal area of the plate part 22b which is of the external insulation sealing member 22 and in which the through-hole 22d is formed.

The electrode terminal 23 includes a plate-shaped terminal body 23a disposed outside the protrusion direction of the protrusion part 21 on the cap part 20 of the container 30 and a column-shaped connection part 23b which penetrates the through-hole 21a formed in the recess part 21x. The terminal body 23a has a flat outer edge corresponding to the shape of the inner edge of the frame body 22e. The connection part 23b takes roles for electrically connecting the terminal body 23a and the current collector 12 and mechanically bonding the cap part 20 and the electrode assembly 11. The electrode terminal 23 disposed at the positive electrode side is made of aluminum or an aluminum alloy, and the electrode terminal 23 disposed at the negative electrode side is made of cupper or a cupper alloy.

The electrode terminal 23 is a member for completing electrical connection between the non-aqueous electrolyte secondary battery 1 and an external load by means of the terminal being fixed by welding onto the surface of the terminal body 23a (the terminal is of the not-shown external load that is, a device which consumes electric energy of the non-aqueous electrolyte secondary battery 1). Otherwise, the electrode terminal 23 is a member for completing electrical connection between a plurality of non-aqueous electrolyte secondary batteries 1 (not-shown) arranged next to each other by means of the terminal bodies 23a of the respective non-aqueous electrolyte secondary batteries 1 being fixed by welding using a bus bar.

Here, the electrode terminal 23 may be configured such that the terminal body 23a and the connection part 23b thereof are made of the same material by forging, casting, or the like.

In addition, the electrode terminal 23 may be configured such that the terminal body 23a and the connection part 23b thereof are independent of each other, and that the terminal body 23a and the connection part 23b are integrally formed using two different kinds of materials or the same material.

Figure 2:
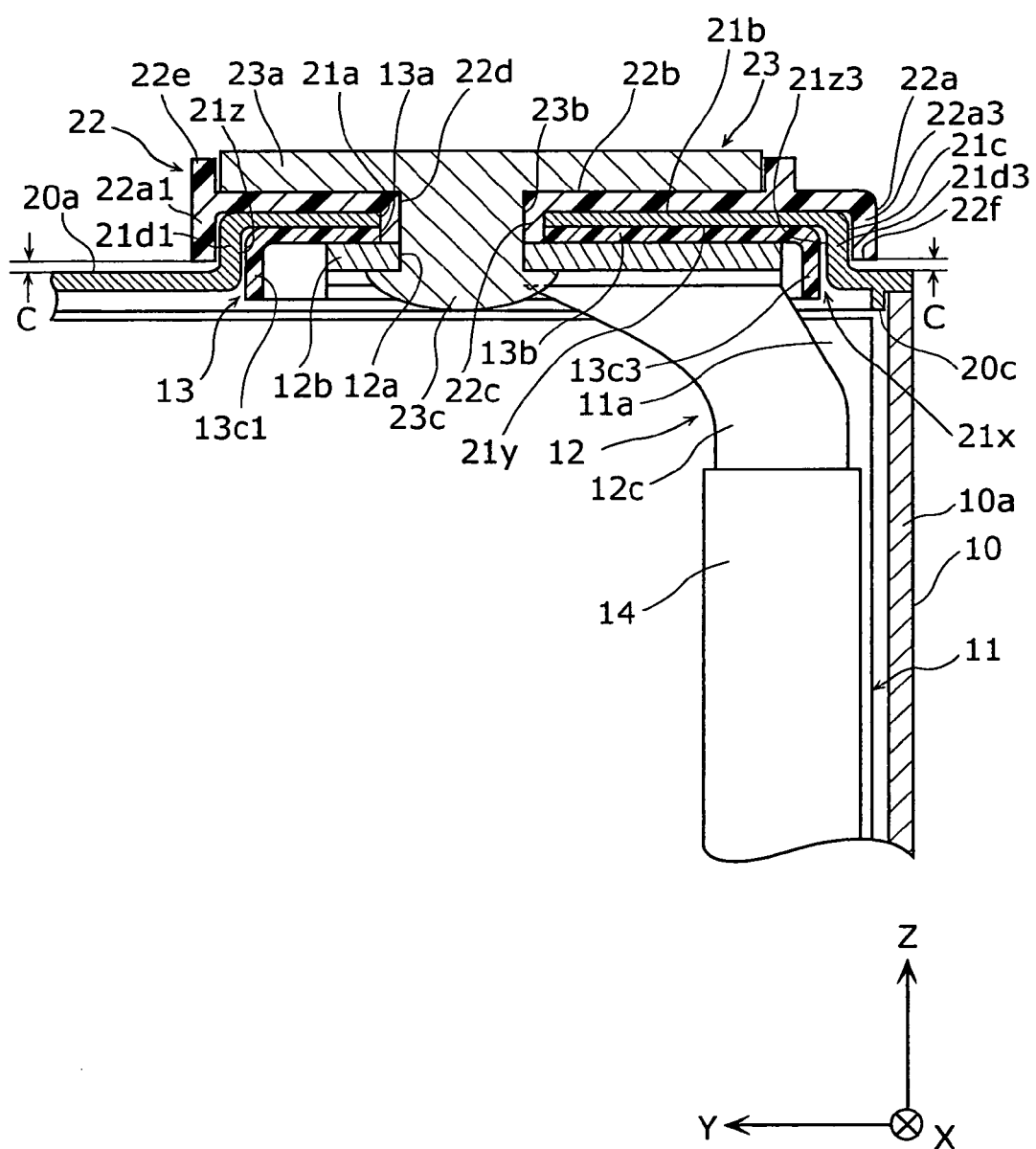
FIG. 2 is a cross-sectional view, in the Y-Z plane, of main parts around one of the electrode terminals of the non-aqueous electrolyte secondary battery.
Figure 3:
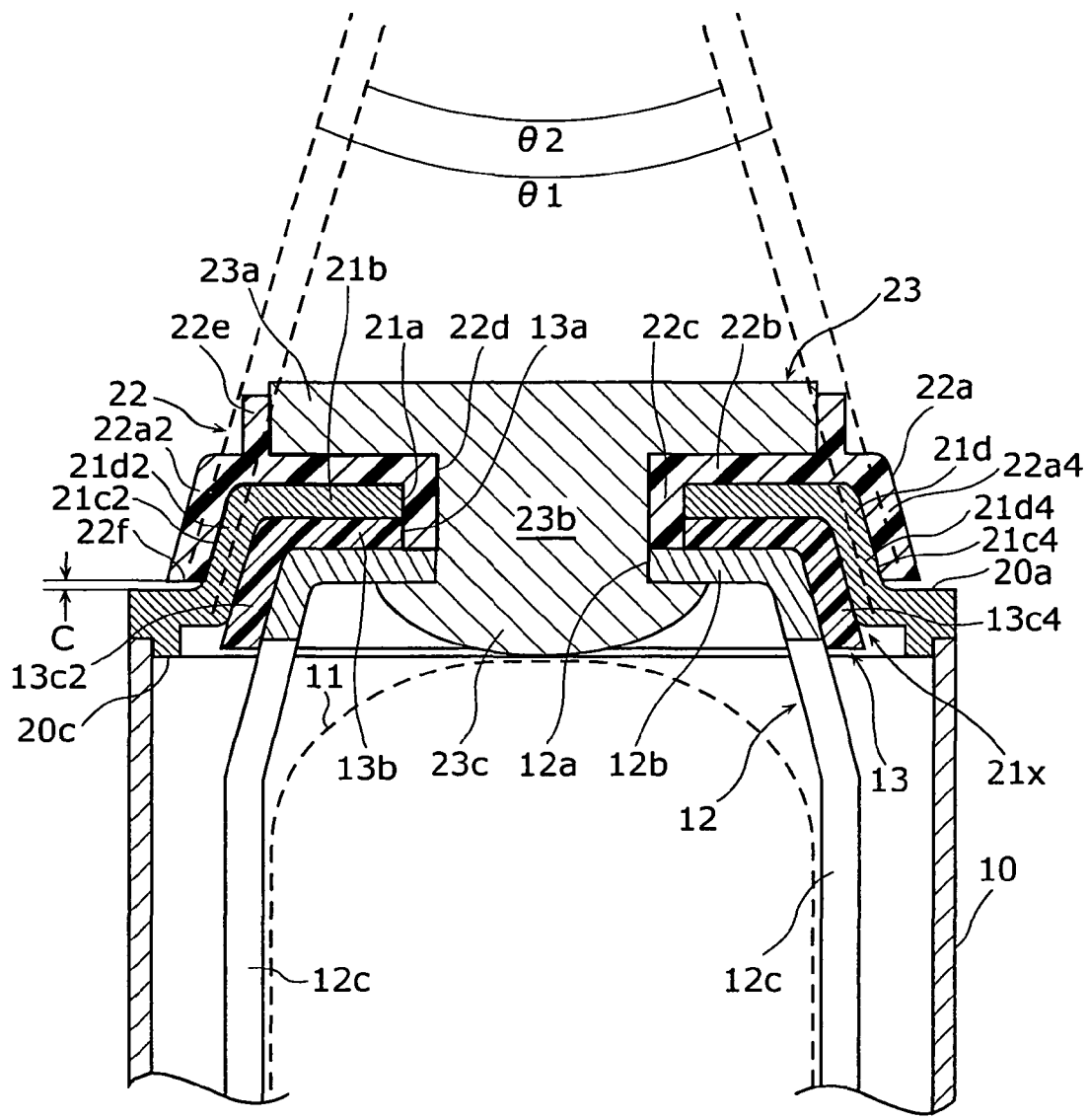
FIG. 3 is a cross-sectional view, in the X-Z plane, of main parts around the electrode terminals of the non-aqueous electrolyte secondary battery.

Next, with reference to FIG. 2 and FIG. 3, a detailed description is given of the structure of main parts around the electrode terminal 23 and the current collector 12 of the non-aqueous electrolyte secondary battery 1 according to this embodiment. FIG. 2 is a cross-sectional view, in the Y-Z plane, of main parts around one of the electrode terminals of the non-aqueous electrolyte secondary battery 1 already assembled as shown in FIG. 1. FIG. 3 is a cross-sectional view, in the X-Z plane, of the main parts around the electrode terminal of the non-aqueous electrolyte secondary battery 1 shown in FIG. 1.

As shown in FIG. 2 and FIG. 3, the structure of the main parts around the electrode terminal 23 and the current collector 12 of the non-aqueous electrolyte secondary battery 1 is a stack of the electrode terminal 23, the external insulation sealing member 22, the protrusion part 21 of the cap part 20, the internal insulation sealing member 13, and the plate part 12b1 of the current collector 12 stacked from above in the listed order. The external insulation sealing member 22 is disposed such that the plate part 22b is stacked on a plate part 21b of the protrusion part 21 on a plate part 13b (see a later-provided description) of the internal insulation sealing member 13, and that the cylinder part 22c penetrates through the through-hole 21a formed in the cap part 20 and the through-hole 13a formed in the internal insulation sealing member 13. The cylinder part 22c has an end surface which is on the same plane on which the lower surface of the internal insulation sealing member 13 is present and, together with the lower surface of the internal insulation sealing member 13, is above the upper surface of the plate part 12b1 which forms the principal surface of the current collector 12. The inner circumference of the cylinder part 22c of the external insulation sealing member 22 and the through-hole 12a of the current collector 12 are approximately the same in size and shape. The cylinder part 22c and the through-hole 12a are penetrated by the connection part 23b of the electrode terminal 23. In other words, the outer circumference of the connection part 23b is in contact with the inner circumference of the cylinder part 22c and the through-hole 12a in the current collector 12. The connection part 23b of the electrode terminal 23 has a riveted end 23c formed in the state where the connection part 23b already penetrates through the cylinder part 22c of the external insulation sealing member 22 and the through-hole 12a formed in the current collector 12. The riveted end 23c is formed by riveting an end part of the connection part 23b so that the riveted end 23c has an outer diameter larger than the diameter of the through-hole 12a, and the end part of the connection part 23b is positioned opposite to the terminal body 23a in the terminal electrode. In other words, the electrode terminal 23 having the riveted end 23c as a pressure-bonding end part for sandwitching and pressure-bonding, in the recess part 21x, the cap part 20 of the container 30 and the current collector 12 etc. together with the terminal body 23a, and is thereby electrically connected to the current collector 12.

Since the outer diameter of the riveted end 23c is larger than the diameters of the respective through-holes 21a, 22d, 13a, and 12a, the external insulation sealing member 22, the cap part 20, the internal insulation sealing member 13, and the current collector 12 are pressure-bonded to each other and integrally fixed by being sandwitched by the terminal body 23a of the electrode terminal 23 and the riveted end 23c. In this way, the electrode terminal 23 pressure-bonds the protrusion part 21 of the container 30 and the external insulation sealing member 22, and thereby seals the protrusion part area having the through-hole 21a in the cap part 20 of the container 30 and the electrode terminal 23, using the external insulation sealing member 22 and the internal insulation sealing member 13. In addition, since the electrode terminal 23 is into contact with the current collector 12 at the connection part 23b and the riveted end 23c, the electrode terminal 23 is electrically connected to the current collector 12 in a state where the electrode terminal 23 already penetrates through the protrusion part 21 of the cap part 20 via the through-hole. Here, since the side surface of the connection part 23b is covered by the cylinder part 22c of the external insulation sealing member 22, the cap part 20 and the connection part 23b are securely in an insulated state.

Next, the structures of the respective parts are described.

As shown in FIG. 2 and FIG. 3, the cap part 20 in this embodiment is formed to have, on the back side (the lower side), a frame part 20c having an outer shape matching the inner edge shape of an opening 10x of the container body 10 so as to fit into the opening 10x. The frame part 20c is formed inside the side end which is of the cap part 20 and abuts the upper end surface of the container body 10. In other words, the cap part 20 is configured to have a larger thickness in the area with the frame part 20c than in the other area of the cap part 20. In addition, the cap part 20 other than the protrusion part 21 has the largest thickness in the area with the frame part 20c, the second largest thickness in the area outside the frame part 20c, and the smallest thickness in the area inside the frame part 20c.

In addition, each of the structural members of the cap part 20 has a cross section having an approximately even thickness. The cap part 20 has a recess part 21x corresponding to the protrusion part 21, at the back side of the protrusion part 21. In other words, the protrusion part 21 of the cap part 20 is formed, for example, by pressing plate-shaped member having an even thickness to form a protrusion and a recess therein. In other words, the container 30 includes the cap part 20 having the protrusion part 21 and also having the recess part 21x formed at the position which is in the inner surface of the wall of the container 30 and corresponds to the position of the protrusion part 21 when the protrusion part 21 is formed. The recess part 21x includes a bottom surface 21y, and a side surface 21z continuously formed between the bottom surface 21y and the inner surface of the wall of the container 30. Accordingly, the cap part 20 includes a side wall part 21d which forms a side surface 21c of the protrusion part 21 and a side surface 21z of the recess part 21x. As shown in FIG. 2 and FIG. 3, in a plan view, the side wall part 21d is formed (i) to be continuous from the outer edge of the rectangular-shaped plate part 21b to the cap body 20a along the lateral direction (X-axis direction) of the cap part 20 and the longitudinal direction (Y-axis direction), and along a direction crossing the cap body 20a. The side wall part 21d has four side parts 21d1, 21d2, 21d3, and 21d4 facing four directions. Adjacent ones of the four side parts 21d1, 21d2, 21d3, and 21d4 are continuous to each other. Among the four side parts 21d1, 21d2, 21d3, and 21d4, the paired side parts 21d1 and 21d3 continuous to the outer edge in the lateral direction (X-axis direction) of the plate part 21b of the protrusion part 21 are formed to be bent perpendicularly with respect to the cap body 20a and the plate part 21b (see FIG. 2). In addition, among the four side parts 21d1, 21d2, 21d3, and 21d4, the paired side parts 21d2 and 21d4 continuous to the outer edge in the longitudinal direction (Y-axis direction) of the plate part 21b of the protrusion part 21 are formed by being bent so as to be farther apart from each other at the positions closer to the cap body 20*a* (see FIG. 3). In other words, the first side wall 21*c*2 and the second side wall 21*c*4 at the inner side in the X-axis direction of the paired side parts 21*d*2 and 21*d*4 in the Y-axis direction of the side wall part 21*d* are tilted so as to be farther apart from each other at the positions closer to the upper surface 20*b* of the cap part 20. The side surface 21*z* of the recess part 21*x* is a surface which faces the paired wall parts 12*b*2 (later described) of the base part 12*b* of the current collector 12 through the side wall parts 13*c* (later described) of the internal insulation sealing member 13.

In other words, the side surface 21*z* of the recess part 21*x* has the shape corresponding to the at least one of the outer shapes of the paired bridge parts 12*c* of the current collector 12 and the outer shapes of the wall parts 12*b*2.

The internal insulation sealing member 13 has a plate part 13*b* and a side wall part 13*c*, similarly to the protrusion part 21 formed in the cap part 20. The internal insulation sealing member 13 has an upper-part shape corresponding to the shape of the recess part 21*x*. The plate part 13*b* has the shape of a flat plate parallel to the plate part 21*b* of the protrusion part 21, and, in a plan view, has the shape of a rectangle with the sides each parallel to the X-axis direction or Y-axis direction. The plate part 13*b* includes the aforementioned through-hole 13*a* formed therein. The side wall part 13*c* is formed to perpendicularly extend from the outer edge of the plate part 13*b* toward the electrode assembly 11 (that is, downward). The side wall part 13*c* has four side parts of 13*c*1, 13*c*2, 13*c*3, and 13*c*4 facing four directions. Adjacent ones of the four side parts 13*c*1, 13*c*2, 13*c*3, and 13*c*4 are continuous to each other. The side wall part 13*c* is parallel to the inner surface of the aforementioned side wall part 21*d*. In other words, among the four side parts 13*c*1, 13*c*2, 13*c*3, and 13*c*4, the paired side parts 13*c*1 and 13*c*3 respectively extending from the paired side parts in the X-axis direction of the plate part 13*b* are formed to be perpendicular to the plate part 13*b*. Among the four side parts 13*c*1, 13*c*2, 13*c*3, and 13*c*4, the paired side parts 13*c*2 and 13*c*4 are formed to respectively extend, with a tilt, from the paired side parts in the Y-axis direction of the plate part 13*b*, so as to be farther apart from each other at the positions closer to the bottom part. As shown in FIG. 3, the inner surfaces of the paired side parts 21*d*2 and 21*d*4 at opposite sides and the outer surfaces of the paired side parts 13*c*2 and 13*c*4 are in contact with each other. The paired side parts 21*d*2 and 21*d*4 among the side parts of the side wall part 21*d* are continuous from the outer edge in the longitudinal direction of the plate part 21*b* of the protrusion part 21, and the paired side parts 13*c*2 and 13*c*4 extend from respectively corresponding two of the side parts in the Y-axis direction of the plate part 13*b* of the internal insulation sealing member 13.

Furthermore, the external insulation sealing member 22 positioned at the upper part of the protrusion part 21 of the cap part 20 has a shape corresponding to the shape of the protrusion part 21 as in the case of the internal insulation sealing member 13. In the external insulation sealing member 22, the lower surface of the plate part 22*b* is in contact with the upper surface of the plate part 21*b* of the protrusion part 21, and the side wall part 22*a* extending from the outer edge of the plate part 22*b* and below the bottom part of the plate part 22*b* has a shape matching the shape of the side wall part 21*d* which forms the side surface of the protrusion part 21. The side wall part 22*a* has four side parts 22*a*1, 22*a*2, 22*a*3, and 22*a*4 facing four directions. Adjacent ones of the four side parts 22*a*1, 22*a*2, 22*a*3, and 22*a*4 are continuous to each other. Among the four side parts 22*a*1, 22*a*2, 22*a*3, and 22*a*4, the paired side parts 22*a*1 and 22*a*3 which extend downward from the paired side parts in the X-axis direction of the plate part 22*b* are formed to be perpendicular to the plate part 22*b*. Among the four side parts 22*a*1, 22*a*2, 22*a*3, and 22*a*4, the paired side parts 22*a*2 and 22*a*4 which extend downward from the paired side parts in the Y-axis direction of the plate part 22*b* are tilted so as to be farther apart from each other at the positions closer to the upper surface 20*b* of the cap part 20 of the container 30. In other words, the side wall part 22*a* of the external insulation sealing member 22 includes: a part 22*a*2 of the side wall part 22*a* as the first side wall part disposed along the part (the first side wall 21*c*2) of a side surface of a first protrusion part 21; and a part 22*a*4 of the side wall part 22*a* as the second side wall part disposed along the part (the second side wall 21*c*4) of a side surface of a second protrusion part 21 which is disposed at the side opposite to the first side wall part.

Here, the first angle $\theta 1$ formed by the part 22*a*2 and the part 22*a*4 of the side wall part 22*a* is equal to the second angle $\theta 2$ formed by the first side surface 21*c*2 and the second side surface 21*c*4. In other words, the inner surface of the part 22*a*2 in the X-axis direction of the side wall part 22*a* and the first side wall 21*c*2 are closely in contact with each other, and the inner surface of the part 22*a*4 in the X-axis direction of the side wall part 22*a* and the second side wall 21*c*4 are closely in contact with each other.

In addition, the distance in the Z-axis direction between the lower surface of the plate part 22*b* and the bottom end of the side wall part 22*a* is less than the distance in the Z-axis direction from the upper surface 20*b* of the cap body 20*a* to the upper surface of the plate part 21*b* of the protrusion part 21. In other words, as shown in FIG. 2 and FIG. 3, in the state where the external insulation sealing member 22, the cap part 20, the internal insulation sealing member 13, and the current collector 12 are sandwitched by the terminal body 23*a* of the electrode terminal 23 and the riveted end 23*c* and thereby being pressure-bonded to each other, the end surface 22*f* of the end part of the side wall part 22*a* (that is, the lower end of the side wall part 22*a*) at the side of the upper surface 20*b* of the cap part 20 of the container 30 is apart from the upper surface 20*b* of the cap part 20 by a predetermined spacing C.

In this way, in the non-aqueous electrolyte secondary battery 1 in this embodiment, the cap part 20 has a protrusion part 21 and a corresponding recess part 21*x*, and the external insulation sealing member 22 and the internal insulation sealing member 13 have shapes matching the shapes of the protrusion part 21 and the recess part 21*x*.

Figure 4:
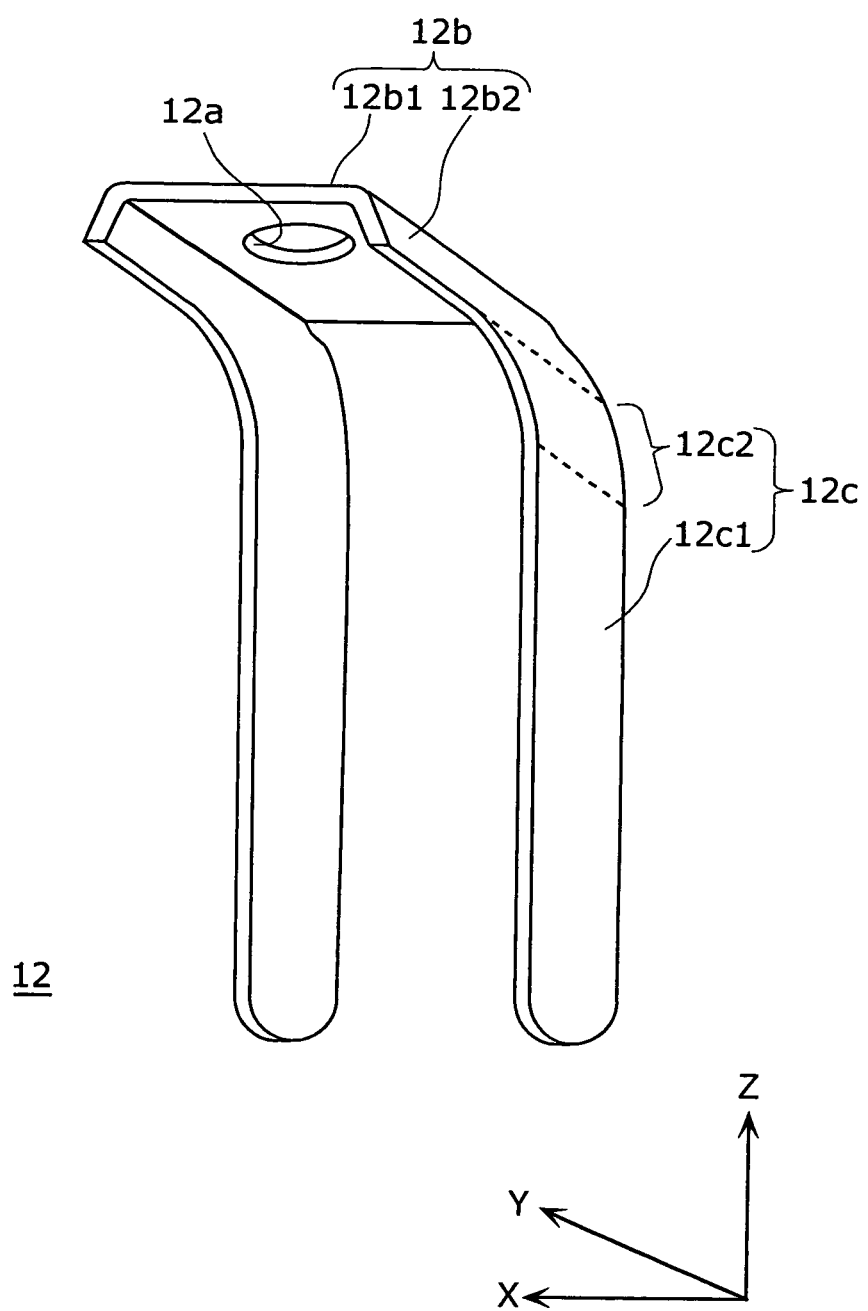
FIG. 4 is a perspective view of one of the current collectors of the non-aqueous electrolyte secondary battery.
Figures 5A, 5B:
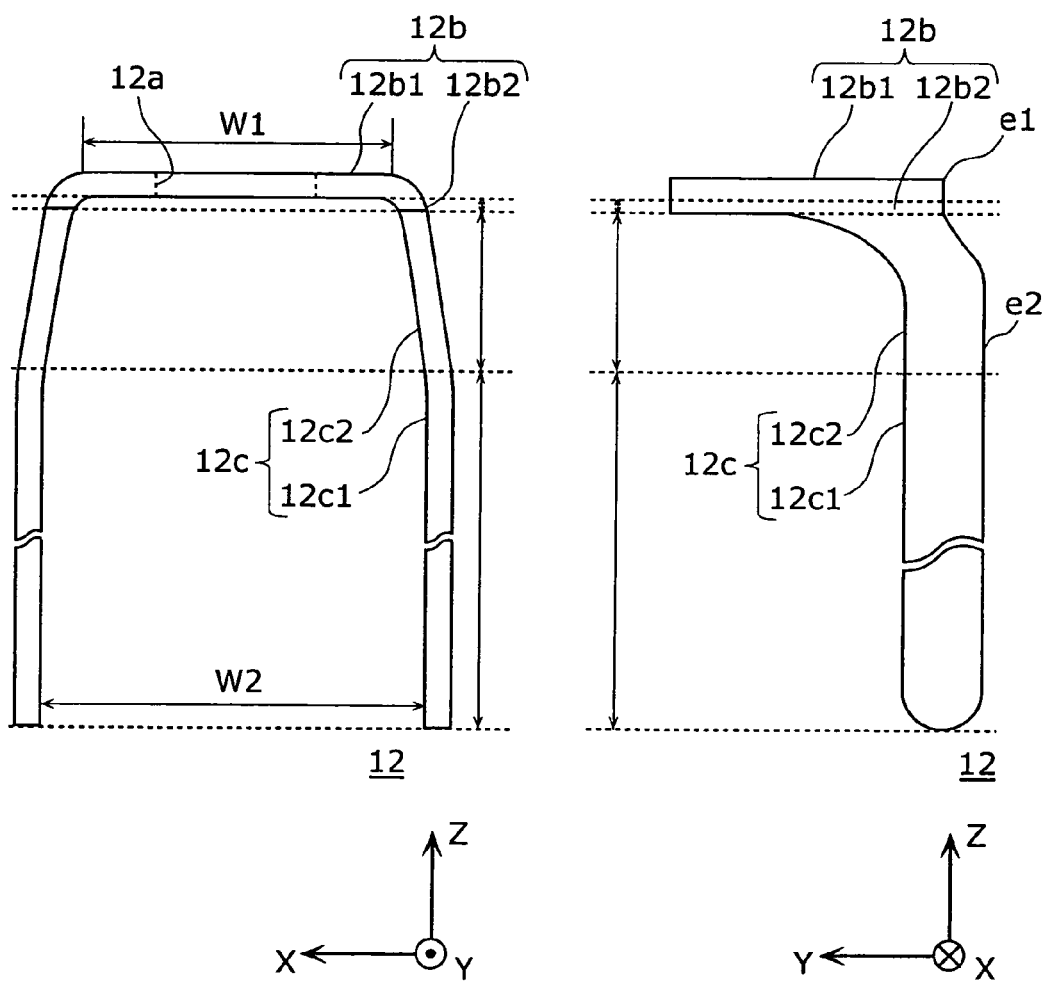
FIG. 5A is a view of one of exemplary current collectors when viewed in the Y-axis direction in a non-aqueous electrolyte secondary battery according to the present invention.
FIG. 5B is a view of one of exemplary current collectors when viewed in the Y-axis direction in a non-aqueous electrolyte secondary battery according to the present invention.

Next, with reference to FIG. 4, FIGS. 5A and 5B, the structure of the current collector 12 is described in detail. FIG. 4 is a perspective view looking up the current collector 12. FIG. 5A is a view in the Y-axis direction, and FIG. 5B is a view in the X-axis direction.

As shown in the diagrams, the current collector 12 is formed by, for example, press-bending a single metal plate, and includes a base part 12*b* including a part having a flat plate shape, and paired arm parts 12*c* which extend downward from both the ends in the X-axis direction of the base part 12*b*. In addition, the base part 12*b* of the current collector 12 is positioned inside the container 30 and is connected to the electrode terminal 23 in the recess part 21*x*. The paired arm parts 12*c* of the current collector 12 extend from the base part 12*b* toward the side opposite to the protrusion direction of the protrusion part 21 (that is, below the cap part 20), and are connected to the electrode assembly 11 in the state where the paired arm parts 12*c* sandwitch the electrode assembly 11.

As shown in FIG. 4 and FIG. 5A, the base part 12*b* includes a flat-plate shaped plate part 12*b*1 having a through-hole 12*a* formed therein, and paired wall parts 12*b*2 formed by bending at paired sides in the Y-axis direction of the plate part 12*b*1.

The plate part 12b1 is directly connected to the electrode terminal. The paired wall parts 12b2 are formed continuously from opposing sides of the plate part 12b1 such that the paired wall parts 12b2 face the side surface 21z of the recess part 21x. The paired wall parts 12b2 included in the base part 12b are tilted so as to be farther apart from each other at positions more distant from the plate part 12b1 such that the paired wall parts 12b2 have inner ends facing the side surface 21z which is the inner surface of the side wall part 21d of the recess part 21x in the cap part 20 shown in FIG. 3. Each of the paired wall parts 12b2 is continuous to the corresponding one of the paired arm parts 12c at its end part in the Y-axis direction of the container 30 (the right side in FIG. 5B). In other words, the respective wall parts 12b2 are continuous to the arm part 12c at only portions thereof closer to the projection part 11a of the electrode assembly 11.

Next, each of the paired arm parts 12c includes an arm body 12c1 connected to the electrode assembly 11 and a bridge part 12c2 which bridges the arm body 12c1 and the wall part 12b2 of the base part 12b. In other words, the paired arm parts 12c have paired arm bodies 12c1 and paired bridge parts 12c2. Each of the paired arm bodies 12c1 is a long flat plate which extends from the plate part 12b1 downward in the direction orthogonal to the plate part 12b1 along the side surface of the projection part 11a in the X-axis direction at the positive electrode side of the electrode assembly 11. In short, the paired arm bodies 12c1 are parallel to each other. As shown in FIG. 3, the paired arm bodies 12c1 sandwitch the electrode assembly 11 therebetween. The arm part 12c of the current collector 12 is connected to the electrode assembly 11 at a position in the Y-axis direction closer to the short side surface 10a of the container 30 than to the position of the protrusion part 21 inside the container 30. In addition, the bridge part 12c2 connects the arm body 12c1 and the paired wall parts 12b2 of the base part 12 by being, when viewed in the X-axis direction, curved from the recess part 21x toward the side of the short side surface 10a of the container 30. In other words, as shown in FIG. 5B, in the Y-axis direction of the container 30, an edge e2 which is of the arm part 12c of the current collector 12 and at the side of the short side surface 10a of the container body 10 of the container 30 is positioned closer to the short side surface 10a of the container body 10 of the container 30 than an edge e1 which is of the base part 12b of the current collector 12 and at the side of the short side surface 10a.

Here, as shown in FIG. 5B, the end portions of the paired arm bodies 12c1 are round when seen from a viewpoint in the X-axis direction. By configuring the arm bodies 12c1 to have round end portions, it is prevented that the surface of the electrode assembly 11 is damaged when the electrode assembly 11 is connected to the current collector 12. It is to be noted that the arm bodies 12c1 may be configured to have rectangular end portions instead of round end portions.

On the other hand, as shown in FIG. 5A, each of the paired bridge parts 12c2 has the same angle with respect to the plate part 12b1 of the base part 12b as the angle of the wall part 12b2 with respect to the plate part 12b1 of the base part 12b. In other words, the bridge parts 12c2 are paired structural elements of the current collectors 12 formed along the lines extending from the paired wall parts 12b2. In addition, the paired bridge parts 12c2 are flat plate-shaped parts which connect the arm bodies 12c1 and the base part 12b. The paired bridge parts 12c2 are tilted so as to be farther apart from each other at the positions closer to the bottom part. In other words, the paired bridge parts 12c2 are apart from each other with spacings that are smaller at positions closer to the base part 12b. Since the paired wall parts 12b2 and the paired bridge parts 12c2 are tilted in this way, each of the plate parts 12b1 directly in contact with the plate parts 13b of the internal insulation sealing members 13 has, in the X-axis direction of the upper surface of the plate part 12b1, a width W1 smaller than the spacing W2 between the paired arm bodies 12c1 (here, the X-axis direction is the direction in which the paired arm bodies 12c are arranged). Since the paired wall parts 12b2 and the bridge parts 12c2 are formed along the extension lines, and the arm parts 12c and the base parts 12b of the current collector 12 are integrally formed, it is easy to form the arm parts 12c and base parts 12b of the current collectors 12 having sufficient strength and form the paired arm parts 12c precisely.

In addition, as shown in FIG. 2, FIG. 4, and FIG. 5B, the bridge part 12c2 extends from the wall part 12b2 of the base part 12b in the direction toward the Y-axis direction end part of the container 30 such that the arm body 12c1 is positioned at the Y-axis direction end part side of the container 30. In this way, the outer side of the arm body 12c1 extends to a point outer than a back end e1 of the plate part 12b1.

In the non-aqueous electrolyte secondary battery 1 according to this embodiment, the paired arm parts 12c of the current collector 12 are configured to sandwitch the electrode assembly 11, and have a spacing W2 larger than a width W1 of the base part 12b in the direction in which the paired arm bodies 12c are arranged.

For this reason, it is possible to secure a wide spacing between the paired arm parts 12c which sandwitch the electrode assembly 11, and thereby secure a wide space for housing the electrode assembly 11 to be sandwitched by the paired arm parts 12c. In short, it is possible to secure the wide width in the X-axis direction of the electrode assembly 11. In this way, it is possible to increase the volume of the electrode assembly 11 to be housed inside the container 30, and thereby further increase the housing efficiency of the electrode assembly 11 with respect to the capacity of the container 30.

In addition, in the non-aqueous electrolyte secondary battery 1 according to this embodiment, since the paired bridge parts 12c2 of the arm parts 12c of the current collector 12 connect the paired arm bodies 12c1 connected to the electrode assembly 11 and the base part 12b of the current collector 12, the paired bridge parts 12c2 are apart from each other with spacings that are smaller at positions closer to the base part 12b. In other words, the paired arm parts 12c are spaced apart more than the width W1 of the base part 12b in the direction in which the paired arm parts 12c are arranged, by forming the paired bridge parts 12c2 to be apart from each other with spacings that are smaller at positions closer to the base part 12b.

Furthermore, since the electrode assembly 11 has a flat winding-type shape, and thus, as shown in FIG. 3, the electrode assembly 11 has end parts which are narrowest in the longitudinal direction in a view of a cross section about the winding axis. Considering the shape, as shown earlier in FIG. 5A, the current collector 12 includes: the plate part 12b1 having the width W1 smaller than the spacing W2 between the paired arm bodies 12c1; and the paired bridge parts 12c2 which are apart from each other with spacings that are smaller at positions closer to the base part 12b. In this way, the current collector 12 forms a space that matches the cross section about the winding axis of the winding-type electrode assembly 11.

In this way, in the current collector 12, it is possible to secure a larger space in the X-axis direction of the container body 10. Furthermore, it is possible to configure a large-capacity non-aqueous electrolyte secondary battery including current collectors which are thicker in the X-axis direction and larger in volume than a conventional container including conventional current collectors including base parts having the same size as the base parts 12b of the current collectors 12.

In addition, it is possible to form the current collector 12 to have the paired arm parts 12c which extend from the base part 12b connected to the electrode terminal 23 in the recess part 21x, with a larger spacing W2 that is determined without being restricted by the inner size of the recess part 21x. Accordingly, it is possible to secure a larger width W2 and house the electrode assembly 11 having a larger width in the X-axis direction between the arm parts 12c.

In addition, in the non-aqueous electrolyte secondary battery 1 according to this embodiment, the bridge parts 12c2 which are continuous from the base part 12b of the current collector 12 to the arm parts 12c are flat plates which are formed (i) integrally with the plate part 12b1 and the paired wall parts 12b2 and (ii) to have a shape matching the shape of the inner surface of the recess part 21x. For this reason, it is possible to reduce the distance from the arm bodies 12c1 to the plate part 12b1 as much as possible, and shorten the current collection path. For this reason, it is possible to reduce internal loss in the current collector 12. In addition, since it is easy to form the current collector 12 having the flat plate-shaped bridge parts 12c2, it is possible to reduce mechanical stress added onto the current collector 12 itself.

In addition, in the non-aqueous, electrolyte secondary battery 1 according to this embodiment, the base part 12b includes the plate part 12b1 and the paired wall parts 12b2 which are bent with respect to the plate part 12b1, and the paired wall parts 12b2 are formed continuously with the paired bridge parts 12c2 of the paired arm bodies 12c. For this reason, it is possible to increase the strength of the base part 12b of the current collector 12, and prevent deformation of the arm parts 12c.

In the non-aqueous electrolyte secondary battery 1 according to this embodiment, the container 30 includes a wall with a protrusion part 21 formed thereon, and further includes a recess part 21x formed at the position which is on an inner surface of the wall of the container 30 and corresponds to the position of the protrusion part 21. The current collector 12 electrically connected to the electrode terminal 23 inside the container 30 includes a base part 12b connected to the electrode terminal 23 inside the recess part 21x.

In this way, the base part 12b of the current collector 12 connected to the electrode terminal 23 is housed in the recess part 21x formed in the container 30. Thus, it is possible to adjust the space other than the recess part 21x in the inner space of the container 30 to the shape of the electrode assembly 11. In this way, it is possible to reduce wasteful space produced when the electrode assembly 11 is housed inside the container 30 only by adjusting the outer size of the electrode assembly 11 to the size of the inner space. In this way, the shape of the container 30 is adjusted to the shape of the electrode assembly 11 without changing the structure of the electrode assembly 11. Therefore, it is possible to easily increase the housing efficiency of the electrode assembly 11 with respect to the inner space of the container 30.

In addition, in the non-aqueous electrolyte secondary battery 1 according to this embodiment, (i) the recess part 21x of the container 30 includes the bottom part 21y and the side surface 21z formed continuously between the bottom surface 21y and the inner surface of the wall of the container 30, and (ii) the side surface 21z has the shape which matches at least one of the outer shapes of the bridge parts 12c2 of the arm parts 12c of the current collector 12 and the paired wall parts 12b2 of the base part 12b.

For this reason, even in a state where the base part 12b is disposed inside the recess part 21x formed on the cap part 20 of the container 30, the paired wall parts 12b2 and the bridge parts 12c2 of the arm parts 12c are arranged along the inner surface of the recess part 21x. Thus, it is possible to reduce mechanical stress added when the current collector 12 is fixed in the recess part 21x. In addition, it is possible to maintain the advantageous effects provided by the current collector itself, for example, the effects of shortening the current collection path for the current collector 12 and reducing internal loss.

However, the present invention is not limited to the above embodiment.

Figure 6:
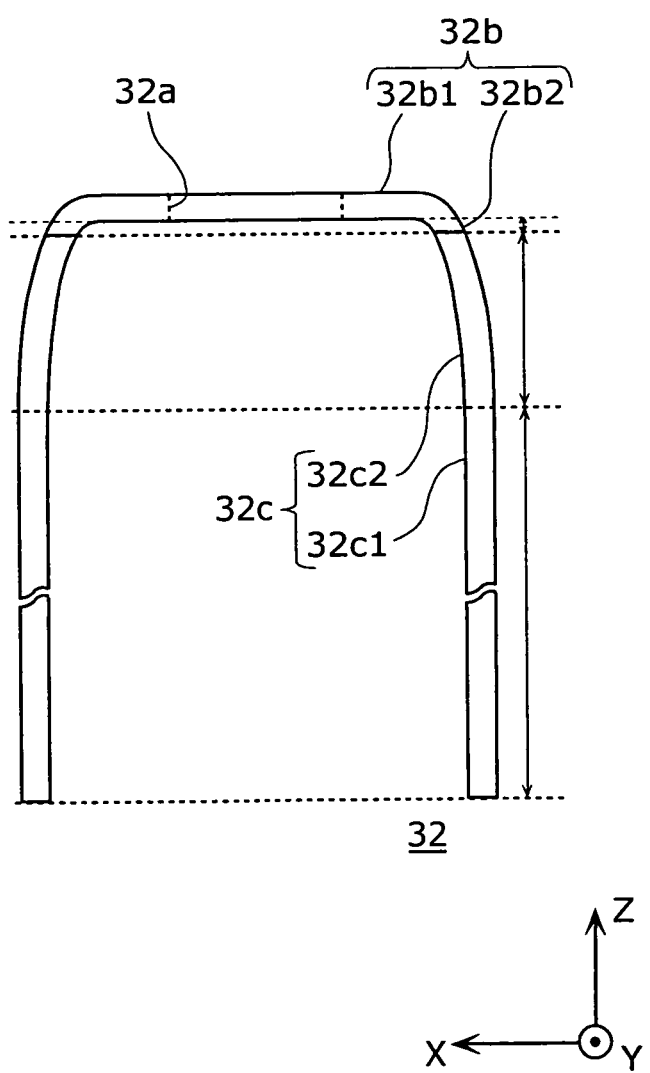
FIG. 6 is a view of one of exemplary current collectors when viewed in the Y-axis direction in a non-aqueous electrolyte secondary battery according to the present invention.

As shown in FIG. 5A, it is assumed here that, in the non-aqueous electrolyte secondary battery 1 according to this embodiment, the bridge parts 12c2 of the arm parts 12c of the current collector 12 when viewed in the Y-axis direction are continuous from the paired wall parts 12b2 and the paired arm bodies 12c1 and have a bent along the inner shape of the recess part 21x. However, the bridge parts 12c2 do not always need to be continuous and have a bent in such a manner. For example, as shown in FIG. 6, the bridge parts 32c2 of the arm parts 32c of the current collector 32 may have a curve along the paired wall part 32b2 and the paired arm bodies 32c1. In this case, the bridge parts 32c2 when viewed in the Y-axis direction are approximated more closely to the outer shape of the electrode assembly 11 when viewed in the Y-axis direction. Thus, it is possible to further increase the housing efficiency. In addition, since it is possible to form the bridge parts 32c2 to have curved surfaces instead of flat surfaces, it is possible to provide the bridge parts 32c2 having a rigidity larger than a rigidity obtainable when forming the bridge parts 12c2 to have a shape with a bent at the boundaries between the paired wall parts 12b2 and the paired arm bodies 12c1 when viewed in the Y-axis direction of the current collector 12. It is to be noted that the structural elements assigned with numerical references starting with 32 of the current collector 32 shown in FIG. 6 are not described here because the descriptions provided for the structural elements assigned with numerical references starting with 12 can be substituted.

Figure 7:
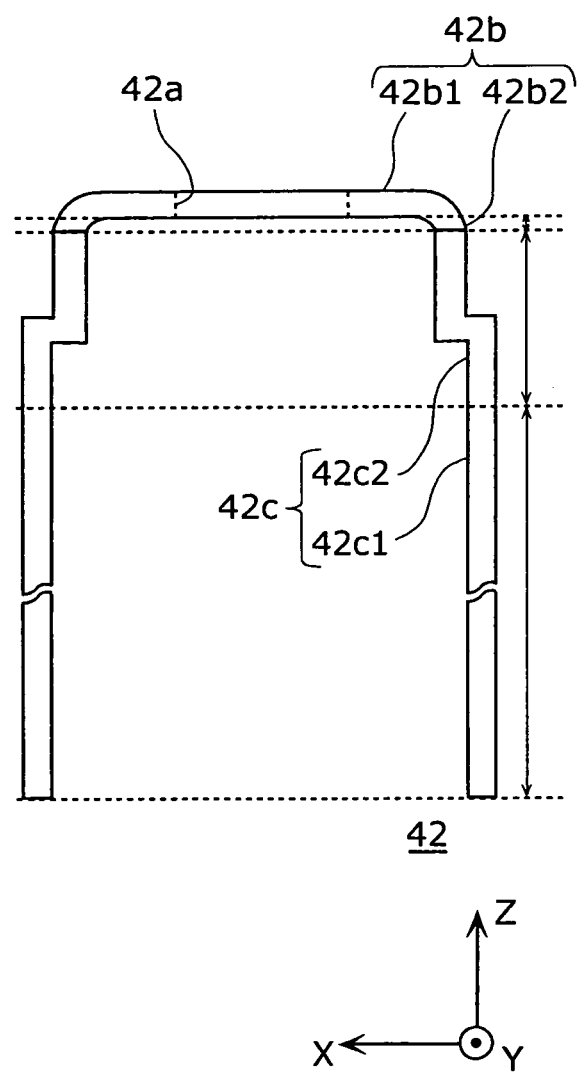
FIG. 7 is a view of one of exemplary current collectors when viewed in the Y-axis direction in a non-aqueous electrolyte secondary battery according to the present invention.

In addition, in the non-aqueous electrolyte secondary battery 1 according to this embodiment, as shown in FIGS. 5A, 5B, and 6, the current collector 12 as an example is configured such that the widths W1 in the X-axis direction of the plate part 12b1 of the base part 12b with respect to the spacing W1 between the arm bodies 12c1 facing each other of the paired arm bodies 12c are smaller continuously in relation to the bridge parts 12c2 and the wall parts 12b2 of the plate part 12b1. However, the widths do not need to be continuously small. For example, as shown in FIG. 7, a configuration is also possible in which the spacing W2 is discontinuously reduced to a horizontal width W1. FIG. 7 shows the configuration in which the bridge parts 42c2 and the wall parts 42b2 of the plate part 42b are bent with a right angle. With this configuration, it is possible to provide the advantageous effect of increasing the housing efficiency, as in the cases of the configurations including the current collectors 12 and 32 as shown in FIGS. 5A, 5B, and 6.

In other words, it is only necessary for the current collector according to the present invention to have the paired arm parts 12c for sandwiching the electrode assembly 11 which are spaced apart from each other with a spacing larger than the width in the X-axis direction of the base part 12b. Thus, there is no restriction on how and to what degree the paired arm parts 12c are apart from each other more than the width in the X-axis direction of the base part 12b. It is to be noted that the structural elements assigned with numerical references starting with 42 of the current collector shown in FIG. 7 are not described here because the descriptions provided for the structural elements assigned with numerical references starting with 12 can be substituted.

Figure 8:
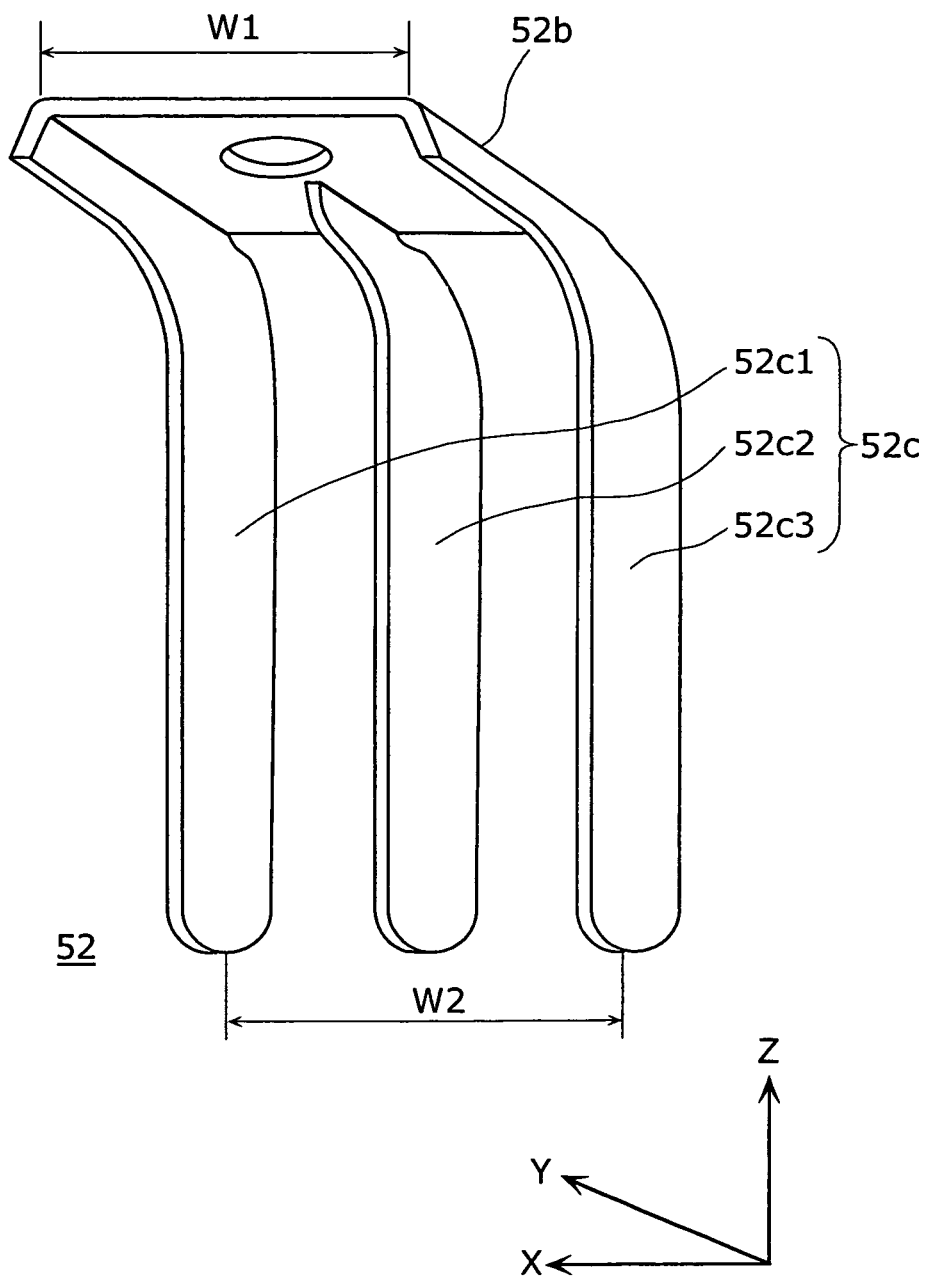
FIG. 8 is a perspective view of one of exemplary current collectors in a non-aqueous electrolyte secondary battery according to the present invention.

In addition, in the non-aqueous electrolyte secondary battery 1 according to this embodiment, the current collector 12 has the paired arm parts 12c (that is, two arm parts 12c). However, the current collector 12 having the paired arm parts 12c is exemplary. For example, a current collector 52 is possible which is configured to have three arm parts 52c1 to 52c3 or more in combination with the base part 52b. The current collector 52 shown as an example in FIG. 8 includes the three arm parts 52c1 to 52c3. It is possible to realize a non-aqueous electrolyte secondary battery in which the electrode assembly 11 is connected between the arm part 52c1 and the arm part 52c2 and between the arm part 52c2 and the arm part 52c3. This non-aqueous electrolyte secondary battery has a large capacity and a high housing efficiency.

Even with this configuration in which the spacing W2 between the paired arm parts 52c1 and 52c3 is larger than the width W1 of the base part 12b, it is possible to provide approximately the same advantageous effects as the effects obtainable in the above-described embodiment. In other words, although the current collector 52 according to the present invention needs to have the paired arm parts which are outermost two of the plurality of arm parts and which are apart from each other with a spacing larger than the width of the base part, the current collector 52 is free of restrictions on the number, shapes etc. of its arm parts.

In the non-aqueous electrolyte secondary battery 1 in this embodiment, the recess part 21x of the cap part 20 is a recess formed to have a shape inverse to the shape of the protrusion part 21 formed on the upper surface 20b of the cap part 20. However, the recess part 21x in the present invention may be formed irrespective of the presence or absence of the protrusion part 21. More specifically, the upper surface may be a flat surface without any protrusion part, and a cap part may be employed which has a recess part 21x formed by performing a process such as pressing or cutting onto the back surface opposite to the upper surface. Even with the configuration, it is possible to increase the housing efficiency of the electrode assembly 11. In addition, since the part other than the recess part 21x of the cap part 20 has a larger thickness, it is possible to increase the rigidity of the cap part 20 and to increase the strength of the non-aqueous electrolyte secondary battery.

However, it is preferable to form the protrusion part 21 when forming the recess part 21x because the following advantageous effects can be obtained. Disposing the electrode terminal 23 on the upper surface of the protrusion part 21 used as the protrusion part according to the present invention facilitates positioning of the electrode terminal 23, which makes it possible to increase the productivity.

In addition, in the non-aqueous electrolyte secondary battery 1 in this embodiment, the internal insulation sealing member 13, the base part 12b of the current collector 12, and the riveted end 23c are housed in the recess part 21x of the cap part 20. However, the non-aqueous electrolyte secondary battery 1 is not limited to a battery having the structure shown in FIG. 2 and may be configured to include a riveted end 23c having a reduced height instead or include a joint part which is formed through a process of welding or the like as a member for connecting the electrode terminal 23 and the current collector 12. In this case, the base part 12b of the current collector 12, the internal insulation sealing member 13; and the rivet end 23c as a pressure-bonded end part are housed in the space between a bottom surface 21y of the recess part 21 and the lower portion including a lower surface 20d which is of the cap part 20 and has the recess part 21x formed therein.

When the connecting part is formed without forming the rivet end 23c, the base part 12b of the current collector 12 and the internal insulation sealing member 13 are housed in the space between the bottom surface 21y of the recess part 21 and the lower portion including the lower surface 20d which is of the cap part 20 and has the recess part 21x formed therein. In other words, it is possible to partly house, in the inner space of the recess part 21x, the structural elements that are the base part 12b of the current collector 12, the internal insulation sealing member 13, and the riveted end 23c or the joint part, other than the electrode assembly 11 and the arm parts 12c of the current collector 12 connected to the electrode assembly 11. For this reason, it is possible to approximate the inner shape of the container 30 and the outer shape of the electrode assembly 11. In other words, it is possible to make the electrode assembly 11 closer to the cap part 20 of the container 30 as much as possible when the electrode assembly 11 is housed in the container 30. For this reason, it is possible to increase the housing efficiency of the electrode assembly 11 with respect to the capacity of the container 30 even in the case where the non-aqueous electrolyte secondary battery 1 is configured to include the internal insulation sealing member 13 inside the container 30.

In addition, the electrode assembly in the present invention is a winding-type electrode assembly in the above description, but may be a stacking-type electrode assembly.

In addition, the energy storage element is the non-aqueous electrolyte secondary battery 1 represented by the lithium ion secondary battery in the above description, but may be any other secondary battery such as a nickel hydrogen battery which can charge and release electric energy as electrochemical reactions. Alternatively, the energy storage element may be a primary battery. Furthermore, the energy storage element may be an element for directly storing electricity as charge, such as an electric double-layer capacitor. In short, the energy storage element in the present invention may be any element for storing electricity, and thus the present invention is not limited to the energy storage elements of specific types.

In addition, in the above description, the battery container including the container body 10 and the cap part 20 corresponds to an element container in the present invention, and the electric terminals are provided on the cap part 20. However, the present invention may be implemented as an energy storage element having electric terminals at the side of a container body. In short, the present invention can be implemented as an energy storage element arbitrarily configured, as long as the energy storage element includes a base part of the current collector disposed inside a recess part formed at an arbitrary position inside the element container. Accordingly, the present invention is not limited to the states of the connection between the cap part and container body of the element container, and the kinds, shapes, number of the members of the element container.

In addition, the battery body is made of aluminum, but may contain an aluminum alloy, any other metal such as stainless steel, or a metal compound. In addition, the battery has a hexahedral shape in appearance, but may have a cylindrical shape instead. In short, the element container according to the present invention is not limited to element containers having specific configurations in terms of shapes, materials, and so on.

To sum up, the present invention may be implemented by adding various kinds of modifications to the above embodiment, in addition to the aforementioned variations, within the scope of the present invention.

Industrial Applicability

The present invention as described above provides an advantageous effect of being able to increase the housing efficiency of an electrode assembly with respect to the capacity of a container, and is applicable to energy storage elements such as secondary batteries.

The invention claimed is:

1. An energy storage element comprising:
a container;
an electrode assembly housed in the container;
an electrode terminal provided in the container; and
a current collector which electrically connects the electrode terminal and the electrode assembly,
wherein the current collector is positioned inside the container, and includes:
a base part connected to the electrode terminal; and
a plurality of arm parts which extend from the base part in a direction away from the electrode terminal and which are connected to the electrode assembly in a state that the plurality of arm parts sandwich the electrode assembly,
wherein the plurality of arm parts comprises paired arm parts which are an outermost two of the plurality of arm parts and are apart from each other with a spacing greater than a width of the base part in a direction in which the paired arm parts are arranged
wherein the paired arm parts include:
paired arm bodies connected to the electrode assembly; and
paired bridge parts which connect the paired arm bodies and the base part, and
wherein the paired bridge parts are apart from each other with spacings that are smaller at positions closer to the base part.

2. The energy storage element according to claim 1, wherein the paired bridge parts comprise flat plate parts which connect the paired arm bodies and the base part.

3. The energy storage element according to claim 2, wherein the base part includes:
a plate part which is directly connected to the electrode terminal; and
wall parts which are formed continuously from the paired bridge parts and are curved or bent with respect to the plate part.

4. The energy storage element according to claim 2, wherein the container includes a wall having an outer surface and an inner surface, the outer surface having a protrusion part formed to protrude outward from the outer surface and the inner surface having a recess part formed at a position corresponding to a position of the protrusion part, and
the base part of the current collector is connected to the electrode terminal in the recess part.

5. The energy storage element according to claim 4, wherein the recess part has a bottom surface, and a side surface continuously formed between (i) the bottom surface and (ii) the inner surface of the wall, and
the side surface has a shape corresponding to at least one of outer shapes of the paired bridge parts and outer shapes of the wall parts.

6. The energy storage element according to claim 4, further comprising:
an insulation member disposed between the recess part and the base part of the current collector,
wherein the insulation member and the base part are housed in a space which is defined by (i) a bottom surface of the recess part and (ii) the inner surface of the wall.

7. The energy storage element according to claim 6, wherein the recess part includes a through-hole through which the electrode terminal penetrates, the electrode terminal includes:
a terminal body disposed at a position corresponding to the recess part and outside the container;
a connection part which penetrates through the through-hole of the recess part; and
a pressure-bonding end part which is electrically connected to the current collector by sandwiching and pressure-bonding, in the recess part, the container and the current collector together with the terminal body, and
wherein the base part, the pressure-bonding end part and the insulation member are housed in the space defined by (i) the bottom surface of the recess part and (ii) the inner surface of the wall.

8. The energy storage element according to claim 7, wherein the
pressure-bonding end part comprises a riveted end formed by riveting an end part of the connection part so that the riveted end has an outer diameter larger than a diameter of the through-hole, the end part of the connection part being positioned opposite to the terminal body in the electrode terminal.

9. The energy storage element according to claim 1, wherein the container comprises a body, and a cap which covers an opening in the body and includes a protrusion protruding from the cap in a direction away from the electrode assembly.

10. The energy storage element according to claim 9, wherein the paired arm parts include:
paired arm bodies connected to the electrode assembly; and
paired bridge parts which connect the paired arm bodies and the base part, and are formed at an angle with respect to the base part.

11. The energy storage element according to claim 10, further comprising:
an internal insulation sealing member formed between the paired bridge parts and a side wall part of the protrusion.

12. The energy storage element according to claim 11, wherein the body of the container comprises a pair of opposing short sides and a pair of opposing long sides which connect the pair of opposing short sides, and
wherein the paired bridge parts project from the base part toward a short side of the pair of opposing short sides such that a distance between the paired arm parts of the current collector and the short side is less than a distance between the base part and the short side.

13. The energy storage element according to claim 9, further comprising:
an external insulation sealing member formed between the protrusion and the electrode terminal.

14. The energy storage element according to claim 10, wherein the protrusion comprises a pair of side wall parts which are formed at a first angle, and the external insulation sealing member comprises a pair of side parts which are formed at a second angle equal to the first angle.

15. An energy storage element comprising:
a container comprising a cap which includes a protrusion protruding from the cap;
an electrode assembly housed in the container, the protrusion protruding in a direction away from the electrode assembly;
an electrode terminal formed in the cap; and a current collector which electrically connects the electrode terminal and the electrode assembly, and comprises:
a base part formed in the protrusion and connected to the electrode terminal; and
a pair of arm parts which extend from the base part in a direction away from the electrode terminal and are connected to opposing sidewalls of the electrode assembly, a distance between the pair of arm parts being greater than a width of the base part:
wherein the pair of arm parts include:
   a pair of arm bodies connected to the electrode assembly; and
   a pair of bridge parts which connect the pair of arm bodies and the base part, and
wherein the pair of bridge parts are apart from each other with spacings that are smaller at positions closer to the base part.

* * * * *